(12) United States Patent
Stofko

(10) Patent No.: US 6,406,786 B1
(45) Date of Patent: Jun. 18, 2002

(54) BONDING OF SOLID LIGNOCELLULOSIC MATERIALS

(75) Inventor: John I. Stofko, Beaverton, OR (US)

(73) Assignee: Carbocol Systems Inc., Portland, OR (US)

( * ) Notice: Subject to any disclaimer, the term of this patent is extended or adjusted under 35 U.S.C. 154(b) by 0 days.

(21) Appl. No.: 09/373,545

(22) Filed: Aug. 13, 1999

Related U.S. Application Data

(62) Division of application No. 08/934,213, filed on Sep. 19, 1997, now Pat. No. 6,083,623.

(51) Int. Cl.[7] .............................. B32B 5/16; B27N 3/00
(52) U.S. Cl. ....................... 428/327; 428/407; 156/622; 156/284
(58) Field of Search ................................ 428/403, 407, 428/327; 156/62.2, 284

(56) References Cited

U.S. PATENT DOCUMENTS

| | | | | |
|---|---|---|---|---|
| 4,016,353 A | * | 4/1977 | Goheen et al. ............... 536/69 |
| 4,183,997 A | * | 1/1980 | Stofko ........................ 428/326 |
| 4,524,164 A | * | 6/1985 | Viswanathan et al. ........ 524/14 |
| 4,627,951 A | * | 12/1986 | Shen .......................... 264/109 |
| 4,654,259 A | * | 3/1987 | Stofko ........................ 428/326 |
| 4,944,823 A | * | 7/1990 | Stofko ........................ 156/283 |
| 5,017,319 A | * | 5/1991 | Shen .......................... 264/124 |
| 5,641,819 A | | 6/1997 | Campbell |
| 5,846,788 A | * | 12/1998 | Pedersen et al. ............ 435/101 |
| 6,083,623 A | * | 7/2000 | Stofko ........................ 428/403 |
| 6,214,265 B1 | * | 4/2001 | Rosthauser et al. ......... 264/109 |

FOREIGN PATENT DOCUMENTS

| | | |
|---|---|---|
| AT | 276734 | 3/1969 |
| EP | 0530638 A1 | 3/1993 |
| WO | 9738833 | 10/1997 |

OTHER PUBLICATIONS

Sjostrom, "Wood Chemistry—Fundamental Applications", *Academic Press,* pp. 208, (1981).

\* cited by examiner

*Primary Examiner*—Hoa T. Le
(74) *Attorney, Agent, or Firm*—Browdy and Neimark P.L.L.C.

(57) ABSTRACT

Consolidated or composite lignocellulosic products such as fiberboard, particle board, chipboard, waferboard, plywood, straw composites, etc. are formed by using a particulate binder or adhesive constituting particles of crude cellulose polysaccharide materials, e.g. wood flour or ground straw, coated with MDI or other isocyanate binder in a thickness preferably in the range of 1–7 $\mu$m.

20 Claims, No Drawings

BONDING OF SOLID LIGNOCELLULOSIC MATERIALS

This is a division of parent application Ser. No. 08/934,213, filed Sep. 9, 1997 now U.S. Pat. No. 6,083,623.

FIELD OF INVENTION

The present invention relates to the manufacture of industrially usable bodies, such as boards, panels and molded products of plant composite materials, more especially fiberboard, particleboard and the like made of bonded straw, wood pieces or particles or the like. More particularly, the present invention relates to the bonding of solid organic materials including wood particles, wood fibers, straw and the like, sometimes hereinafter broadly referred to as "lignocellulosic" materials[1], and especially in the manufacture of composite or bonded products from such lignocellulosic materials, particularly composite straw or the like products or composite wood products such as plywood and reconstituted wood, e.g. fiberboard, chipboard, particleboard, and the like.

[1] Although wheat straw and other bodies of annual plants contain some lignin, they are not usually referred to as lignocellulosic materials. However, for purposes of the present invention, these are included within the term "lignocellulosic materials".

BACKGROUND OF THE INVENTION

Although substantial strides have been made in recent years in the bonding of wood particles such as shown in the Stofko U.S. Pat. No. 4,944,823, which relates to the use of isocyanate based adhesives, wood particles are still mostly bonded by liquid adhesives produced by the condensation of formaldehyde with urea, melamine or mixtures thereof, or with phenol, resorcinol or mixtures thereof.

Procedures have also been developed to convert liquid phenolic resins to water-soluble solid powders by spray drying. Such spray-dried phenol-formaldehyde resins in powdered form are more economical than liquid phenol-formaldehyde resins in the manufacture of some composite wood products. Thus, such powdered phenol-formaldehyde resins are being manufactured and used in the oriented strand board industry. Spray drying, however, is not suitable for producing powdered resins from other liquid resins, such as urea-formaldehyde or other aldehyde condensation products.

As was the case in 1985 when the application which matured into Stofko '823 was filed, there is still a continuous incentive to reduce the costs involved in the manufacture of bonded wood products. Moreover, it would still be desirable to avoid the use of formaldehyde condensation products in view of the fact that such condensates can release formaldehyde which is at least an eye and mucosa irritant, which is carcinogenic, and which certainly has an undesirable odor. Many attempts have been made to solve these problems. One approach is disclosed in an earlier Stofko patent, namely U.S. Pat. No. 4,183,997, which discloses a binder for wood based on carbohydrates and catalyst.

The use of liquid isocyanate adhesives such as 4,4-diphenylmethane diisocyanate (hereinafter MDI) has remained difficult for the reasons set forth in the aforementioned Stofko U.S. Pat. No. '823. The above-mentioned spray drying which can be used to produce powdered phenol-formaldehyde resins is also not suitable for producing powdered resins from MDI. Thus, a main problem of the use of MDI as a bonding resin is that it is too concentrated; as a result it is very difficult to distribute small quantities of MDI over a large surface of lignocellulose materials to be bonded. New liquid spraying techniques have improved but not solved the problem of resin distribution over the bonding surface. Most attempts to extend MDI, such as by emulsification and incorporation of water, have failed.

So far, the only practical means of extending MDI is that disclosed in Stofko U.S. Pat. No. '823 wherein the MDI is extended by a suitably active particulate material, exemplified therein as preferably carbohydrates, especially sugars and starches, by intermixing and pre-reacting the liquid MDI with such an active solid particulate material or pasty material. The reaction produces a more fully activated powdery adhesive, e.g. a carbohydrate powder, which can be more easily distributed than liquid MDI and which provides excellent composite wood products such as plywood, particleboard, fiberboard, chipboard and the like.

Whereas excellent composite products can be formed according to the exemplified embodiments of Stofko U.S. Pat. No. '823, the preferred active materials disclosed in that patent, namely sugars and starches, have the significant disadvantage of being soluble or gellable in water, and the inorganic active materials do not work as well. Moreover, the bulk densities of the MDI-reacted sugars and starches of U.S. Pat. No. '823 are undesirably high so that a much greater amount of powdered binder is needed for effective bonding of lignocellulosic materials than is desirable; for example, sucrose has a specific volume of 1.8 $cm^3/g$ and wheat flour has a specific volume of 1.48 $cm^3/g$.

As indicated above, the preferred active carriers for the MDI in Stofko U.S. Pat. No. '823, i.e. starches and sugars, are relatively heavy. To obtain an easily spreadable powdery binder using starch or sugar according to Stofko U.S. Pat. No. '823, it is necessary to have a starch:MDI ratio of at least 4:1, or a sucrose:MDI ratio of at least 9:1; otherwise the binder is either pasty or even a high viscosity liquid due to the inevitable presence of moisture and the fact that sugar crystals are water soluble and starch particles are gellable in water. Thus, another problem according to the examples of Stofko '823, if insufficient starch or sugar is present, i.e. less than the aforementioned ratios, is that the binder is in a form which is difficult to use, namely the undesirable pasty or high viscosity liquid form which is difficult to use.

At the present time, there are only two industrially viable methods for distributing polymeric MDI-based adhesives, namely by spraying liquid adhesives or by high shear blending of powdered adhesives, and an easily spreadable powder consistency cannot be made according to the starch and sugar examples of Stofko U.S. Pat. No. '823 using lower ratios of starch or sugar to MDI than those indicated above, as would be desirable.

Thus, the need still exists for improvements in bonding materials for lignocellulosic materials such as wood chips, wood fibers and other organic materials including straw, organic fibers, etc., or even for woodboard in the manufacture of plywood. In particular, a suitable way to increase the efficiency of MDI distribution to a better level than what is disclosed in Stofko '823 has heretofore not been found.

SUMMARY OF INVENTION

It is therefore an object of the present invention to overcome deficiencies in the prior art, such as indicated above. It is another object to provide improvements in the bonding of solid lignocellulosic materials. It is a further object to provide for improved wood bonding using an improved particulate isocyanate-based adhesive.

In general, the present invention relates to an improved process for producing an isocyanate-based adhesive in lightweight powder form which is reactive with lignocellulosic materials to bond such materials, and preferably one which not only bonds such lignocellulosic materials but also does not adhere to metals, as well as the resultant novel composition and its use. The process contemplates subjecting fine powders of crude cellulose polysaccharides to a modification step using an isocyanate, most preferably MDI, and preferably also in the presence of a suitable mold release agent e.g. a high melting point wax such as montan wax or zinc stearate, the modification including contacting the crude cellulose polysaccharide particles with the selected isocyanate in an amount sufficient to effectively produce the subject powder-form reactive cellulose polysaccharide/isocyanate adhesive binder, with or without the optional mold release agent being present. As a result, the isocyanate-activated cellulose polysaccharide particles provide for a large and significant extension of the isocyanate which in turn facilitates improved distribution of the resultant adhesive. If suitable lubricant is present, it improves mold release, but surprisingly does not inhibit or reduce the adhesive qualities of the activated particles in their ability to bond solid lignocellulosic materials.

The key features of the present invention involve the selection of a lightweight water-insoluble organic material for admixture with the isocyanate, particularly a crude cellulose polysaccharide; use of a relatively high ratio of the isocyanate to the crude cellulose polysaccharide particles; and confrication of the mixture to provide a very fine particulate material of light weight in which the isocyanate has activated the surface of the crude cellulose polysaccharide by reacting with OH groups present on the surface of the crude cellulose polysaccharide particles, the isocyanate being preferably deposited in a thickness on the individual crude cellulose polysaccharide particles calculated to be about 1–7 μm, most preferably 1–3 μm, although thicker coatings up to about 13 μm can also be provided.

Confrication is essentially a high shear blending of high intensity, producing heat which facilitates surface activation of the particles. Isocyanate confricated to the crude polysaccharide particles first becomes physically attached by surface adsorption and then by chemical reaction between the isocyanate and the OH groups on the cellulose polysaccharide particles. It is theorized that the confrication causes interparticle frictional forces to be imparted between and among the crude cellulose polysaccharide particles in the presence of the isocyanate, resulting in polysaccharide surface activation by the isocyanate, whereby free OH groups present in the finely particulate crude cellulose polysaccharide surfaces are made reactive with the isocyanate.

Any equipment capable of producing a high degree of friction and a large number of collisions among the fluid suspended particles is suitable for the confrication process according to the present invention. The confrication process, preferably carried out on air-suspended particles, produces energy, perceptible basically as heat, which is then imparted to the crude cellulose polysaccharide particles. It may be theorized that the elevated temperature so created speeds up the surface activation of the crude cellulose polysaccharide particles and is a measure of the surface activation.

The confrication time is variable, but is preferably between about 3 seconds and 30 minutes dependent on the nature of the equipment in which the confrication is carried out, the type and initial fineness of the crude cellulose polysaccharide particles used, the ratio of polysaccharide to isocyanate, the degree of filling of the equipment, and the rate of rotation (e.g. revolutions per minute) of the equipment which is a measure of intensity of interparticle turbulence or friction. In any selected combination of the above variables, which can be routinely tested, the energy as heat imparted to the mixture must be controlled so that there is a temperature rise by at least 10F.° and not more than 50F.°: this degree of heating insures that adequate surface activation has been achieved; too much energy imparted to the polysaccharide would undesirably start the sequence of bonding reaction. For example, the time to reach a temperature rise of 10F.° in a confricator at a low rpm, e.g. 50–100 rpm, could be as long as 3–30 minutes, whereas the time to reach a temperature rise of 50F.° at 2,000 rpm could be as little as 3 seconds. In any given case, the amount of time for confrication is easily determined by routine testing.

As regards the selection of isocyanate, MDI is readily commercially available, is inexpensive compared with other isocyanates, and works well, and therefore is preferred. Hereinafter, the isocyanate will be referred to simply as MDI, although it must be understood that other isocyanates can be successfully used in the present invention without even the necessity of routine testing. However, if necessary, routine testing of other isocyanates can be easily carried out.

Proper selection of the active particles according to the present invention is crucial to obtaining improved results. As indicated above, the active particles used according to the present invention can be generally classified as crude cellulose polysaccharide particles of which more is described below. In general, however, these particles should be water insoluble, meaning that they should not dissolve or gel in water, should be of very fine particle size preferably in the range of about 50–150 μm, be of light weight with a density at least below 0.5, and constitutes a plant material containing cellulose polysaccharides in a proportion of at least about 40% by weight. Two good examples are wood flour and ground straw.

Lastly, the ratio of the MDI or other isocyanate to the crude cellulose polysaccharide particles is desirably in the range of about 1:4 to 2:1, but is preferably about 1:2 to 1:1. The preferred range provides about twice as much MDI as can be used with starch powder and more than four times the quantity of MDI as can be used with sucrose according to the embodiments of the aforementioned Stofko U.S. Pat. No. '823. Use of an MDI:crude cellulose polysaccharide particle ratio of 1:2 to 1:1 moreover gives the desired coating thickness of MDI on the crude cellulosic polysaccharide particles of 1–7 μm, mentioned above as being desirable for obtaining the best results.

If the MDI layer is less than about 1 μm thick, some OH groups on the crude cellulose polysaccharide surface are not activated or not sufficiently activated, with the result of a somewhat reduced performance in terms of internal bond in the resultant consolidated product per unit weight of the MDI/cellulose polysaccharide particle blend. The MDI layer thickness can be as great as 7 μm. On the other hand, if the MDI layer is thicker than about 3 μm, this is wasteful of expensive MDI, some of which is free and not associated or reacted with the OH groups on the crude cellulose polysaccharide particle surfaces, and moreover such free MDI does not fully benefit from the presence of such cellulose polysaccharide particles, and the free MDI can also react with water and thus be wasted. As the MDI layer on the cellulose polysaccharide particle surface becomes progressively thicker, the resultant powder becomes damper but retains its particulate form. The drier the powder, and especially in the range of MDI layer thickness of 1–7 μm, and preferably 1–3 μm, the easier it is to spread and distribute.

DETAILED DESCRIPTION OF THE EMBODIMENTS

As indicated above, an important feature of the present invention, in order to obtain superior results, involves the selection of appropriate active carrier particles for the MDI. These particles must be organic, must have OH groups on the surface thereof, and must be neither water soluble nor meltable upon heating, and must have sufficient cohesive strength so that the final bonded lignocellulosic product does not easily disintegrate.

Polysaccharides are polymers of glucose. If glucose units in the polysaccharide are connected by the so-called beta linkage, a strong, stable water-insoluble polymer, cellulose, is formed. If glucose units are connected by the so-called alpha linkage, starch is formed which undergoes gelation in water. While the present invention is based on the use of crude cellulose polysaccharide particles, starch particles can form a portion of the total adhesive particles. When the quantity of starch particles exceeds the quantity of crude cellulose polysaccharide particles, the problems mentioned above become increasingly problematic. Therefore, any starch particles present should be in a quantity not substantially in excess of the quantity of crude cellulose polysaccharide particles. For example, good results are obtained with equal quantities by weight of these different particles, but desirably only a minor proportion of starch particles approaching 50% at most should be included, preferably no more than about 40% of the particulate material, and most preferably no more than about 35%. The critical active polymer particles used in the present invention are cellulose polysaccharide particles, as indicated above, these particles being water-insoluble, unmeltable upon heating, having sufficient cohesive strength, and having OH groups on the surface thereof to react or associate with the MDI.

It has been found in accordance with the present invention that providing a very fine powder of the crude cellulose polysaccharide powder, which constitutes the active particulate material which forms a reactive substrate for the MDI as indicated above, achieves a substrate which is chemically substantially more active. It is believed that by grinding a crude cellulose polysaccharide to a fine powder to provide a large surface area, OH groups are made free and available for reaction with MDI. It has also been found that when such fine crude cellulose polysaccharide powder is confricated with MDI, a reactive MDI/carbohydrate binder is obtained which can be used for bonding cellulosic or other lignocellulosic materials.

As indicated above, crude cellulose polysaccharides have a significant advantage of being insoluble in water, being unmeltable, possessing higher cohesive strength and being much more economical than other carbohydrates such as sugar and starch. Comparative studies as reproduced below have shown that MDI confricated with finely divided crude cellulose polysaccharide powder performs as well if not better as a binder than does MDI confricated with sugars and/or starches, and is much easier to spread. As a result of much lower bulk density compared with sugars and starches, much less powder is needed; moreover, crude cellulose powders are significantly less expensive than sugars or starches.

The source of the crude cellulose polysaccharide particles used in accordance with the present invention are bodies of plants, the major components of which are cellulose and hemicellulose. The stalks of a wide variety of plants can be used to provide the crude powdered cellulose polysaccharide material used in the present invention as all stalks of plants are composed basically of cellulose polysaccharide with a variety of other non-cellulose constituents. If the stalk of the plant in question contains at least 40% cellulose polysaccharide and less than 90% cellulose, it can be dried and used to form the crude cellulose polysaccharide powder of the present invention. Examples of such suitable materials are wood, wheat straw, rice straw, corn straw, hemp (if it becomes legal in the USA to use same), dried grass, rice hulls, bagasse, flax, stalks of other plants such as soya, cotton including recycled and shredded cotton fabrics, shredded regenerated cellulose fibers and fabrics such as rayon, shredded paper, etc. As indicated above, two good examples are wood flour and ground straw because they are plentiful and inexpensive. Substances which are associated with cellulose polysaccharides in plants, such as various gums, tanins, lignins, etc., usually do not interfere with surface activation by MDI.

However, tree bark is normally unsuitable because of its highly irregular, inconsistent and heterogeneous composition. Bodies of practically all plants are primarily made of cellulose. Wood bark is chemically extremely variable depending on the wood species, age, location of the tree and other conditions. Its main constituents are usually about 30% cellulose, about 10% hemicellulose, about 15–30% lignin, and about 20–40% (dry weight) of externally heterogeneous group of substances such as fats, waxes, turpins, resin acids, sterols, phenolic constituents, tanins, flavanoids, and many others. In contrast, there is normally 40–45% cellulose in wood and 51–70% in wheat straw. Wood also contains 27–30% hemicellulose and 28–30% lignin; and wheat straw normally contains 15–30% hemicellulose and 15–19% lignin.

Although plant bodies vary in consistency to some extent depending on the growing conditions including soil conditions and weather, e.g. available sunlight during the growing season, water, etc., in general cellulose is a fiber having a cellular structure, and it therefore has a much higher specific volume than processed and/or purified carbohydrates such as sugars and starches. Thus, while sucrose has a specific volume of 1.08 cm$^3$/g and wheat flour has a specific volume of 1.48 cm$^3$/g, a typical wood flour has a specific volume of 4.89 cm$^3$/g and a typical wheat straw flour has a specific volume of 7.04 cm$^3$/g. With these figures in mind, one gram of wheat straw flour covers 7 times as much area as does one gram of sucrose.

Prior to confrication with MDI, the crude cellulose polysaccharides must be dried and disintegrated to a very fine water-insoluble powder, preferably of a mean particle size of about 50–150 μm, although of course some particles will inevitably be larger and some smaller. Disintegration can be carried out by various conventional methods and means, such as hammer milling or grinding. Powder fineness is technically measured by screen analysis and indicated by mesh size which is related to the particle size such as thickness and diameter. The finer the crude cellulose polysaccharide powder, the larger its surface area and the more OH groups will be available for chemical reaction with the MDI on the total particle surface. Crude cellulose polysaccharides such as wood can be ground to a very fine powder of up to 325 mesh size, which corresponds to about 43 microns thickness.

If the ground crude cellulose polysaccharide is screened, all particles of a size smaller than the screen openings will be used whereas those which are retained on the screen will be either discarded or recycled for further disintegration. While it is indicated above that a mean particle size of 50–150 μm is particularly desirable, a wider size range is useable according to the present invention, and indeed particles of mesh size 400 to 30, equivalent to 36–600 μm thickness, can be used, preferably 300 to 50 mesh. These particles are usually in the form of small fibers having a length about 3–4 times their thickness.

In one gram of crude cellulosic polysaccharide of 400 mesh size, there are approximately 32 million particles. Upon confrication with MDI, these particles become solid adhesive particles. If one gram of MDI is confricated with one gram of crude cellulose polysaccharide particles, 32 million solid particles are obtained. To the contrary, when one gram of liquid MDI is sprayed using the finest spray system known, the MDI can be dispersed to only about 3.8 million droplets of about 75 $\mu$m size. Thus, it will be readily understood that crude cellulosic polysaccharide adhesive particles according to the present invention are capable of covering a much larger area to be bonded than sprayed liquid MDI in accordance with conventional practice.

In some cases, it is desirable to add a small quantity of starch powder to the crude cellulose polysaccharide powder, primarily because it reduces dust in the workplace. In those cases where a minor quantity of starch polysaccharide is used along with the cellulose polysaccharide of the present invention, it is desirable to use starch polysaccharide powder having a finer particle size than the cellulose polysaccharide powder. For example, in a mixture of 70–80% crude cellulose polysaccharide powder and 30–20% starch polysaccharide powder, the crude cellulose polysaccharide powder desirably has a mesh size of 30–200 and the starch polysaccharide, e.g. wheat flour, has a mesh size of 100 to 450, preferably 200–400 mesh.

In cases where a minor proportion of starch particles are used along with the crude cellulose polysaccharide particles, it is particularly advantageous to maintain proportions of the two different types of particles at such a level that the starch particles tend to coat the crude cellulose polysaccharide particles. For example, one gram crude lignocellulose polysaccharide particles of 50 mesh size (300 $\mu$m) is completely covered by about 0.46 grams of starch of 300 mesh size (50 $\mu$m). When such a mixture is confricated with MDI, the MDI is adsorbed preferentially onto the starch particles which swell and gel making the overall mixture more sticky, but still maintaining good spreadability when the slightly sticky powder is applied to the lignocellulosic substrate in a tumbler or the like, e.g. by rubbing or shearing between and among the lignocellulosic substrate pieces moving and rubbing against one another.

Laboratory studies in accordance with the present invention have shown that if a 1 $\mu$m thick layer of MDI is confricated onto a crude cellulosic polysaccharide particle surface, such polysaccharide particle becomes a solid adhesive as pointed out above. Theoretical calculations suggests that confrication leading to a 1–7 $\mu$m thick layer onto particles forming a 2:1 mixture of crude cellulose polysaccharide powder and wheat flour occurs when the ratio of MDI to polysaccharide is between 0.18:1 and 1:1. At 1 $\mu$m MDI coverage, the powder is quite dry. At a coating thickness of 7 $\mu$m of MDI, the powder is wet and sticky, but still usable by rubbing action. Adhesive powder of 1 $\mu$m MDI thickness bonds wood as well as an adhesive power covered with a 7 $\mu$m thick layer of MDI.

As indicated above, the ratio of MDI to the crude cellulose polysaccharide particles is desirably in the range of about 1:4 to 2:1, and preferably about 1:2 to 1:1. However, the particle size of the crude cellulose polysaccharide particles and the presence or absence and size of the starch particles which may be mixed therewith has an effect on the optimum quantity of MDI. Thus, the finer the particles, the greater the surface area and consequently the greater the quantity of MDI needed to provide a coating on the particles of 1–7 $\mu$m thickness, preferably 1–3 $\mu$m. For example, with 240 mesh crude cellulose polysaccharide particles, a suitable ratio of MDI to said polysaccharide particles is between 1:1 and 1:5. With 300 mesh crude cellulose polysaccharide particles, a suitable MDI:polysaccharide ratio is 1:1 to 1:3. With a mixture of 400 mesh crude cellulose polysaccharide particles and a minor amount of starch powder, a suitable ratio of MDI to particles is 1:1.5 to 1:6.

It has been mentioned above that a lubricant, e.g. a high-melting point wax, such as montan wax and/or zinc stearate, can be mixed with the MDI-activated crude cellulose polysaccharide powders of the present invention to improve mold release without reducing their adhesive qualities. When the mixture of lubricant and MDI is confricated together with the crude cellulose polysaccharide powder, the lubricant becomes part of the resultant adhesive powder. It is well known that wood particleboard made using isocyanate adhesives tend to stick to the metallic press platens. The problem is so severe that isocyanate adhesives are not used in the board surface layers, and MDI producers have expended significant effort in attempts to develop additives to MDI which would make MDI self-releasing, so far without success. The addition of lubricant to the MDI-activated powder of the present invention results in good releasing properties from the metal press platens. In general, the quantity of lubricant used is preferably in the range of 2.5 to 20% by weight, preferably 2.5 to 15% by weight, and most preferably 2.5 to 10% by weight based on the weight of MDI.

Solid lubricants are preferably used at a mean particle size of less than 15 $\mu$m and zinc stearate is available as a powder of 1–2 $\mu$m. However, other mold release agents can also be used, and these can be in liquid, semi-liquid, paste or powder form, even though such materials cannot be used with liquid MDI adhesives. One such material tested and found satisfactory is Pennzoil Multipurpose White Grease which is commonly used in the lubrication of cars and machinery. In general, it can be said that small amounts up to about 20% and preferably less than 15%, based on the weight of the MDI, of any high-melting point solid or semisolid, paste or high viscosity liquid lubricant can be used which is capable of preventing adhesion of isocyanates to metals, and these broadly include waxes, stearates and greases. These lubricants should be blended with the MDI prior to confrication of the MDI with the crude lignocellulose polysaccharide powder.

Conventional lubricants can be routinely tested to determine their suitability for use in the present invention. For example, other possibly suitable lubricants include micronized polyethylene wax, micronized fluorocarbon polymers, tetrafluoroethylene polymer in fine particle size (e.g. SST-2 of Shamrock Chemicals Corp. or "Polyfluo 190" of Micro Powders, Inc.), sodium stearate, solid silicone resin powders, oxidized polyethylene waxes, microcrystalline waxes, ethylene co-polymers with acrylic acid or with vinyl acetate, etc.

Another additive, particularly depending on the lignocellulosic material to be bonded, is acid as a sizing agent for reducing swelling of composites. In this regard, a new particleboard industry based on cereal straw instead of wood is now in its infancy. Straw, such as wheat straw, has several important advantages compared with wood: it is an annual plant, it is cheap, and it produces a resultant particleboard which is superior to wood particleboard in certain respects. However, there are some problems created by straw; first, it contains silica, so that urea and phenolic condensation resins are not very effective as binders; second, particleboard formed of straw has a tendency to swell.

It has been found that conventional paraffin emulsions and waxes uses in wood composites in order to reduce swelling are not effective in straw composites bonded with isocyanates. However, in accordance with the present invention it has been found that incorporation of acids into the powder adhesive of the present invention or into the furnish reduces swelling, although the quantity of acid used must not be so great as to reduce the pH of the board below a minimum acceptable level of 4.5.

The acids used for this purpose are desirably inorganic acids in a quantity of 0.5–4% by weight based on the weight of the lignocellulosic material to be bonded, e.g. in this case cereal straw or other fibrous materials such as flax, bagasse, vegetable fiber, etc. Suitable inorganic acids for this purpose are hydrochloric acid, sulfuric acid and phosphoric acid. In the case of straw in particular, the use of strong inorganic acids in an amount of up to 4% by weight is quite feasible as this quantity of acid results in a pH reduction to not less than about 4.5, a level which does not create any danger of hydrolysis over time as it does in the case of bonding of wood particleboard. Importantly, it is surprising that the use of strong acids of this type reduces swelling of particleboard made from straw, and so far these acids are the only efficient sizing agents discovered for straw particleboard.

After formation of the particulate adhesive of the present invention, predominantly of confricated MDI-activated crude cellulosic polysaccharide particles, with or without a small quantity of lubricant to aid in mold release, the adhesive is then ready for use in the bonding of solid lignocellulosic materials. The particles may be applied to the solid lignocellulosic materials in an air or water suspension, or otherwise applied in any conventional way. If the solid lignocellulosic materials to be bonded constitutes straw or wood particles, such as in the manufacture of fiberboard or chipboard or particle board, application may be carried in a tumbler or the like; or if the lignocellulosic particles to be bonded are sufficiently small, such as by shear blending. Heat and pressure are then applied in the usual way to complete the bonding reaction between the MDI-surface activated crude cellulosic polysaccharide particles and the lignocellulosic substrates being bonded together.

As indicated above, the MDI-activated crude cellulose polysaccharide particles can be suspended in water for application to the lignocellulosic material to be bonded. This is possible because by the time water is introduced to the particles, the MDI attached to the crude cellulosic polysaccharide particles has already become fixed to such particles and is not lost by reaction with water. Indeed, the use of water at this stage is sometimes advantageous and may serve to enhance the adhesive quality of the confricated MDI-activated crude cellulosic polysaccharide particles; this phenomenon may be in part due to attractive forces created by the water during initial stages of mixing the particulate adhesive with the lignocellulosic substrate pieces, possibly due to surface tension properties of water. When dispersing such particles in water, a certain quantity of such water will be absorbed by the porous or cellular crude cellulose polysaccharide particles. Most of such absorbed water will, however, be driven off during the application of heat and pressure which completes the bonding reaction between the MDI-surface activated crude cellulosic polysaccharide particles and the lignocellulosic substrate surfaces being bonded together.

To briefly reiterate the sequence of manufacture and use, first (in the case of the use of a lubricant) a small quantity of up to 20% by weight of lubricant is mixed with 100% by weight of MDI and the mixture thoroughly blended to produce a homogeneous MDI/lubricant blend. Then, such blend (or in the case where no lubricant is used, the MDI alone) is confricated with the finely pulverized crude cellulosic polysaccharide powder to produce the MDI-surface activated crude cellulosic polysaccharide adhesive which can be used as a solid binder applied as an air suspended adhesive, or which can be mixed with water to provide a liquid-applicable adhesive. The surface activated crude cellulosic polysaccharide particles are then applied as a powder or optionally suspended in water for application as a wet spray; regardless, the adhesive particles are easily distributed to the surfaces to be bonded by conventional means such as high shear blending or by rubbing type blenders, using a blending time of between 3 seconds and 5 minutes depending on the rate of revolution of the blender and blender design. Bonding is then carried out by the application of heat and pressure.

In the case where a lubricant is mixed with the MDI, such blending must be done just prior to confrication of the MDI with the crude cellulosic polysaccharides. Similarly, the confricated MDI-activated crude cellulosic polysaccharide powder must be used quickly, or it will progressively become inactive. The sooner it is used, the better, and it is preferably used no later than about 20 minutes after its manufacture. A delay of more than two hours between manufacture of the activated powder and its use results in significantly reduced activity.

The quantity of particulate adhesive relative to the lignocellulosic pieces to be adhered to produce the consolidated lignocellulosic product will depend upon the size of the lignocellulosic pieces to be bonded. Thus, the smaller such pieces, such as in the manufacture of particle board or fiberboard, the greater the total surface area and the greater the quantity of particulate adhesive needed. Conversely, for the manufacture of plywood, a much smaller quantity of particulate adhesive according to the present invention is needed. The optimum quantity is easily determined by routine testing, and representative quantities are given in the examples below. It may be said in general, however, that because the crude cellulose polysaccharide particles used in the present invention are two to four times as light as the preferred sugar and starch particles of the aforementioned Stofko U.S. Pat. No. '823, as little as about one-half to about one-fourth the amount of adhesive, on a weight basis, may be used compared with the adhesive of Stofko U.S. Pat. No. '823, the latter of which suggest a range of 1–12% by weight based on the weight of the wood to be bonded. Greater quantities may also be used.

The following examples are offered illustratively:

EXAMPLE 1

Mixtures of three parts by weight of wood flour of 50 mesh and 1.5 parts by weight of 400 mesh wheat flour were respectively confricated with 1.5 parts by weight of MDI, i.e. at a ratio of MDI to polysaccharide particles of 1:3, for respectively 5, 10, 15 and 20 seconds at 1200 rpm to produce MDI activated adhesive particles. Each of the resultant particulate adhesives was then blended with particle board furnish in a blender for ten seconds at 500 rpm at a rate of 6% MDI activated adhesive particles and 94% wood substrate particles. The resultant mixture was then consolidated under heat and pressure for 4.5 minutes at 400° F. to form the resultant particle board. Parameters and results are summarized in Table 1 below:

TABLE 1

| POLYSACCHARIDE | | | CONFIRCATION | | DENSITY | INTERNAL BOND | 24 HR SWELL |
|---|---|---|---|---|---|---|---|
| MDI % | % Wood | % Wheat | Seconds | ° F. | lb/cu ft | PSI | % |
| 1.5 | 3 | 1.5 | 5 | 72 | 45.3 | 107 | 24 |
| 1.5 | 3 | 1.5 | 10 | 76 | 45.1 | 104 | 25 |
| 1.5 | 3 | 1.5 | 15 | 85 | 45.7 | 114 | 26 |
| 1.5 | 3 | 1.5 | 20 | 104 | 45.1 | 112 | 27 |

EXAMPLE 2

Wood flour of average mesh size 240 was confricated with MDI for 7 seconds at 1500 rpm in a laboratory confricator to produce the surface activated crude cellulose polysaccharide powder which was then spread over Douglas Fir particles by blending for 10 seconds at 500 rpm in a laboratory blender; and particleboard was made by heat and pressure consolidation at 400° F., 400 psi pressure for 270 seconds time. Binder composition and achieved physical properties are presented in Table 2.

TABLE 2

| MDI % | WOOD FLOUR % | DENSITY lb/cu ft | INTERNAL BOND PSI | 24-HOUR SWELLING % |
|---|---|---|---|---|
| 1.5 | .625 | 41.2 | 88.5 | 55.4 |
| 1.5 | .83 | 41.4 | 97.3 | 53.3 |

TABLE 2-continued

| MDI % | WOOD FLOUR % | DENSITY lb/cu ft | INTERNAL BOND PSI | 24-HOUR SWELLING % |
|---|---|---|---|---|
| 1.5 | 1.7 | 41.5 | 105.8 | 50 |
| 1.5 | 3.33 | 41.2 | 95 | 52.2 |

EXAMPLE 3

Series of particleboards were made at equal conditions, using respectively (1) liquid MDI applied by spraying, and (2) crude cellulose polysaccharide powder adhesive activated with MDI applied to wood particles in a rubbing type blender. The ⅝ inch thick three layer boards were made at 375° F. press platen temperature and 3 minutes press time. The results are presented in Table 3.

TABLE 3

| ADHESIVE | MDI % | DENSITY lb/cu ft | MODULUS OF RUPTURE PSI | INTERNAL BOND PSI |
|---|---|---|---|---|
| LIQUID MDI | 2.5 | 49 | 2271 | 91.1 |
|  | 1.5 | 49 | 2025 | 64.6 |
| POLYSACCHARIDE/ MDI | 1.5 | 49.3 | 2242 | 103.5 |

EXAMPLE 4

A series of 3 layer, ⅝ inch thick 20×20 inch particleboards were made in laboratory using crude cellulose polysaccharide surface activated by MDI particulate binder applied in a water suspension. Conditions at which boards were made and the achieved physical properties are presented in Table 4.

TABLE 4

| FURNISH MOISTURE | BINDER COMPOSITION % | | | | PRESSING | | DENSITY | INTERNAL BOND | MOD OF RUPTURE |
|---|---|---|---|---|---|---|---|---|---|
|  | MDI | POLYSACCHARIDE | | | ° F. | SEC | lb/cu ft | PSI | PSI |
|  |  | WOOD | WHEAT | WATER |  |  |  |  |  |
| 3% | 1 | 1 | 1 | 5 | 400 | 210 | 44 | 113 | 2400 |
| 6% | 1 | 0.25 | 1 | 2 | 400 | 210 | 43.5 | 114 | 2465 |

EXAMPLE 5

A series of ⅜ inch thick 17×17 inch waferboards of southern yellow pine strands were made by hot pressing under the following conditions: polysaccharide wood flour of 240 mesh size, MDI:polysaccharide ratio 1:1, MDI content 3.5%, total binder content 7%, furnish moisture content 5%, press platen temperature 385° F., pressing pressure 550 psi, pressing time 150 seconds. The resultant board properties as shown in Table 5 were achieved.

TABLE 5

| Board density | 41 lb./cu.ft. |
|---|---|
| Modulus of Rupture |  |
| dry | 4138 psi |
| after vacuum cycle | 2400 psi |
| Modulus of elasticity | 554,000 psi |

TABLE 5-continued

| | |
|---|---|
| Internal bond | 174 psi |
| Thickness swelling after vacuum soaking and drying | 14.7% |

EXAMPLE 6

A series of particleboards of wheat straw furnish were made under the following conditions: press platen temperature 350° F., press pressure 250 psi, furnish moisture content 7%, confrication time 15–25 seconds, mesh size of wood flour 240. The board properties are set forth in Table 6.

TABLE 6

| BINDER COMPOSITION | | | DENSITY | INTERNAL |
|---|---|---|---|---|
| MDI % | WOOD FLOUR | WHEAT FLOUR | lb/cu ft | BOND PSI |
| 1 | 0.5 | 0.5 | 45 | 66.2 |
| 2 | 1 | 1 | 46 | 83 |
| 3 | 1.5 | 1.5 | 45.9 | 107.4 |
| 5 | 2.5 | 2.5 | 45.9 | 125.9 |
| 3 | 0 | 3 | 45.2 | 107 |

While the results for the third and fifth runs were very similar as regards internal bond strength, the fifth run was less economical because wood flour is less expensive than wheat flour and a binding composition based solely on wheat flour was difficult to distribute over the surfaces to be bonded.

EXAMPLE 7

A series of 6×6×0.5 inch particleboards were made from wheat straw furnish at these conditions: furnish moisture content 7%, confrication time 2 minutes, adhesive and furnish blending time 15 seconds, press platen temperature 375° F., press time 4 minutes. Binder composition and test results of board quality are presented in Table 7.

TABLE 7

| ADHESIVE COMPOSITION % | | | | | THICKNESS | WATER |
|---|---|---|---|---|---|---|
| MDI | POLYSACCHARIDE TYPE | % | DENSITY lb/cu ft | INTERNAL BOND PSI | SWELLING % | ABSORPTION % |
| 3 | sucrose | 3 | 41.6 | 83 | 20.9 | 51 |
| 3 | wheat flour | 3 | 38.5 | 93 | 22.5 | 59 |
| 3 | wood flour | 3 | 44.5 | 118 | 17.8 | 62.9 |
| 3 | straw flour | 3 | 40.9 | 105 | 18.8 | 54 |

These data show advantages of crude cellulose polysaccharide powder over sucrose and wheat flour at equal amounts. The crude cellulose polysaccharide performs better because the adhesive compositions of the first and second runs were difficult to distribute over the surfaces to be bonded.

EXAMPLE 8

Particleboards of 6×6×⅝ inch size were made of industrial wheat straw particles at these conditions: straw moisture content 5%, press platen temperature 375° F., press time 3.5 minutes. The MDI/crude cellulose polysaccharide binder was made by confrication of MDI with straw flour of 200 mesh size in a laboratory confricator. MDI/straw flour ratio was 1:2. As thickness swelling reducing ingredient acid was used. Binder composition and physical and dimensional properties achieved are achieved in Table 8.

TABLE 8

| ADHESIVE COMPOSITION % | | | DENSITY | INTERNAL BOND | THICKNESS SWELLING | WATER ABSORPTION |
|---|---|---|---|---|---|---|
| MDI | STRAW FLOUR | ACID | lb/cu ft | PSI | % | % |
| 3 | 6 | 0 | 44.5 | 92 | 17 | 35.8 |
| 3 | 6 | H$_3$PO$_4$ — 2% | 44.6 | 110 | 13.2 | 27.9 |
| 3 | 6 | HCl — 3% | 48.1 | 112 | 8.8 | 20 |
| 3 | 6 | NaCl — 3% | 46.6 | 105.7 | 17.6 | 35 |

The use of NaCl did not affect swelling, whereas both HCl and H$_3$PO$_4$ reduced swelling.

EXAMPLE 9

A series of particleboards of wheat straw furhish were made at these conditions; press platen temperature 350° F., press pressure 250 psi, furnish moisture content 7%. Binder composition and resulting board properties are presented in Table 9.

TABLE 9

| ADHESIVE COMPOSITION % | | | | | |
|---|---|---|---|---|---|
| MDI | WOOD FLOUR | WHEAT STRAW FLOUR | WHEAT FLOUR | DENSITY lb/cu ft | INTERNAL BOND PSI |
| 3 | 1.5 | 0 | 1.5 | 45.9 | 107.4 |
| 3 | 0 | 3 | 0 | 45.3 | 104.5 |
| 3 | 3 | 0 | 0 | 44.9 | 99.5 |

EXAMPLE 10

Fine bark dust was confricated with MDI at the ratio of 2:1 weight—2 parts of bark dust to 1 part of MDI) in a laboratory confricator. As comparison fine wood flour was confricated with MDI at equal conditions. Wood particleboards were made using bark and wood MDI activated powders and tested. The results are presented in the table.

TABLE 10

| ADHESIVE COMPOSITION % | | | DENSITY | INTERNAL BOND PSI | |
|---|---|---|---|---|---|
| MDI | BARK | WOOD | lb/cu ft | DRY | BOILED 2 HR |
| 2 | 4 | 0 | 43.4 | 137.6 | — |
| 2 | 4 | 0 | 42.9 | 98 | 23.6 |
| 2 | 0 | 4 | 42.8 | 141.2 | |
| 2 | 0 | 4 | 43 | 112 | 32.2 |

These results show that one batch of bark produced acceptable results while the other batch did not.

EXAMPLE 11

For example, one hundred parts by weight of wood flour of 50 mesh size, i.e. 300 $\mu$m maximum particle size, is mixed with 46 parts by weight of wheat starch polysaccharide of 300 mesh size, i.e. 50 $\mu$m maximum particle size. MDI is added in an amount of 80 parts by weight, and the mixture is confricated for a few seconds in a blender. The MDI is adsorbed preferentially on the starch particles which swell and gel producing stickiness, whereas the greater quantity of wood flour also receives MDI coating and maintains good flowability of the powder mixture. This composition is suitable as an easily applyable particulate binder.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. In a composite body comprising pieces of lignocellulosic material adhered by an adhesive, the improvement wherein:
    said adhesive is a particulate adhesive of core particles and isocyanate coatings thereon, said particulate adhesive comprising a confricated mixture of said core particles and said isocyanate wherein said core particles comprise crude cellulosic polysaccharide particles having activated —OH group-containing surfaces and a mean particle diameter of 36–600 $\mu$m, said isocyanate coatings being reacted with said —OH groups on said activated surfaces of said core particles, and said isocyanate coatings on said core particles having a thickness of about 1–13 $\mu$m.

2. The composite product according to claim 1 wherein said lignocellulosic material is selected from the group consisting of plywood, wood fiberboard, wood chipboard, wood particle board, wood oriented strand board, straw particle board and straw fiberboard.

3. The composite product according to claim 1 wherein said lignocellulosic material is straw having a pH reduced by the presence of 0.5–4% by weight of a strong inorganic acid, based on the weight of said straw, said pH being no lower than 4.5.

4. The composite product according to claim 1 wherein said isocyanate is MDI.

5. The composite product according to claim 1 wherein said crude cellulosic polysaccharide particles consist essentially of wood flour, ground straw or a mixture thereof.

6. The composite product according to claim 1 wherein said core particles having activated —OH group-containing surfaces further comprise starch particles in an amount of up to 100 parts by weight based on 100 parts by weight of said crude cellulosic polysaccharide particles.

7. The composite product according to claim 6 wherein said starch particles are smaller than said crude cellulosic polysaccharide particles and are present in an amount of no more than 50 parts by weight per 100 parts by weight of said crude cellulosic polysaccharide particles.

8. The composite product according to claim 1 wherein said crude cellulosic polysaccharide particles are primarily in the form of small fibers having a length of about 3–4 times their thickness, and having a mean particle thickness of about 50–150 $\mu$m.

9. The composite product according to claim 1 wherein said crude cellulosic polysaccharide particles have a fine particle size in the range of 50–150 $\mu$m.

10. The composite product according to claim 1 wherein the ratio of said isocyanate to said crude cellulosic polysaccharide particles is in the range of 1:2 to 1:1 and wherein said isocyanate coatings on said core particles have a thickness of 1–7 $\mu$m.

11. In a composite body comprising pieces of lignocellulosic material adhered by an adhesive, the improvement wherein
    said adhesive is a particulate adhesive of core particles and isocyanate coatings thereon, said particulate adhesive comprising a confricated mixture of (1) crude cellulosic polysaccharide particles, (2) starch particles which are smaller than said cellulosic polysaccharide particles and which are present in an amount of up to 100 parts by weight based on 100 parts by weight of said crude cellulosic polysaccharide particles, and (3) said isocyanate,
    wherein said cellulosic polysaccharide particles are coated with said starch particles so as to provide composite particles of said crude cellulosic polysaccharide particles and starch particles, and wherein said composite particles have activated —OH group containing surfaces, said isocyanate coatings being reacted with said —OH groups.

12. The composite body of claim 11 wherein said starch particles are present in an amount of no more than 50 parts by weight per 100 parts by weight of said crude cellulosic polysaccharide particles; said isocyanate is MDI; said crude cellulosic polysaccharide core particles consists essentially of wood flour, ground straw or a mixture thereof, and have a fine particle size in the range of 50–150 $\mu$m; and wherein said isocyanate is present as a coating on said crude cellulosic polysaccharide particles in a thickness of 1–7 $\mu$m.

13. In a method of bonding lignocellulosic surfaces together and thereby producing a consolidated lignocellulosic product, comprising contacting said lignocellulosic surfaces with an isocyanate-based adhesive, the improvement wherein
    said isocyanate-based adhesive is a confricated mixture of core particles of a crude cellulose polysaccharide and said isocyanate, whereby said isocyanate is coated or said core particles in a thickness of about 1–13 µm, said core particles having activated —OH group-containing surfaces and a mean particle diameter of 36–600 µm, said isocyanate being reacted with said —OH groups on said activated surfaces of said core particles.

14. A method according to claim 13 wherein said isocyanate is MDI.

15. A method according to claim 13 wherein said crude cellulose polysaccharide core particles comprise wood flour, ground straw or a mixture thereof.

16. A method according to claim 13 further comprises isocyanate coated starch particles in an amount of up to 100 parts by weight based on 100 parts by weight of said isocyanate coated crude cellulose polysaccharide particles.

17. A method according to claim 16 wherein said starch particles are smaller than said crude cellulose polysaccharide particles and are present in an amount of no more than 50 parts by weight per 100 parts by weight of said crude cellulose polysaccharide particles.

18. A method according to claim 13 wherein said core particles have a mean particle diameter of about 36–600 µm.

19. A method according to claim 13 further comprising a lubricant in an amount of up to 20 parts by weight per 100 parts by weight of said isocyanate.

20. A method according to claim 13 wherein said lignocellulosic material is straw, said method further comprising adding to said straw or said particulate adhesive or mixture thereof a strong inorganic acid in an amount of 0.5 to 4% by weight based on the weight of said straw, and reducing the pH to no lower than 4.5.

* * * * *